(12) United States Patent
Colbath

(10) Patent No.: US 6,591,314 B1
(45) Date of Patent: Jul. 8, 2003

(54) VIDEO INPUT SELECTION FOR INFORMATION HANDLING SYSTEM

(75) Inventor: Mark Allan Colbath, Bedford, TX (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/385,979

(22) Filed: Aug. 30, 1999

(51) Int. Cl.⁷ ................................................ G06F 3/00
(52) U.S. Cl. .............................. 710/36; 710/2; 710/12; 710/18; 712/225
(58) Field of Search .............................. 710/1, 5, 8, 15, 710/20, 36, 38, 62, 64, 73, 131, 2, 11, 12, 17, 18, 41; 381/85; 712/225; 348/705, 706

(56) References Cited

U.S. PATENT DOCUMENTS

| | | | |
|---|---|---|---|
| 3,823,387 A | * 7/1974 | McClellan | 340/172.5 |
| 3,922,641 A | 11/1975 | Gates, Jr. | 340/147 LP |
| 4,347,510 A | 8/1982 | Ishigaki et al. | |
| 4,691,361 A | 9/1987 | Yoshino | |
| 4,763,012 A | 8/1988 | Blankinship | 307/43 |
| 4,821,122 A | 4/1989 | Teskey | 358/181 |
| 4,841,367 A | 6/1989 | Ichikawa et al. | 358/181 |
| 4,996,597 A | 2/1991 | Duffield | 358/181 |
| 5,049,873 A | 9/1991 | Robins et al. | 340/825.06 |
| 5,261,044 A | 11/1993 | Dev et al. | 395/159 |
| 5,264,929 A | 11/1993 | Yamaguchi | 358/108 |
| 5,264,935 A | 11/1993 | Nakajima | |
| 5,287,186 A | 2/1994 | Takamori | 348/705 |
| 5,305,105 A | 4/1994 | Heo | 348/485 |
| 5,572,263 A | * 11/1996 | Kim et al. | 348/705 |
| 5,572,643 A | 11/1996 | Judson | 395/793 |
| 5,687,292 A | 11/1997 | Boda et al. | 395/11 |
| 5,768,508 A | 6/1998 | Eikeland | 395/200.32 |
| 5,768,524 A | 6/1998 | Schmidt | 395/200.54 |
| 5,768,578 A | 6/1998 | Kirk et al. | 395/611 |
| 5,771,226 A | 6/1998 | Kaku | 370/232 |
| 5,774,668 A | 6/1998 | Choquier et al. | 395/200.53 |
| 5,774,669 A | 6/1998 | George et al. | 395/200.54 |
| 5,812,120 A | * 9/1998 | Shim | 345/204 |
| 6,052,471 A | * 4/2000 | Van Ryzin | 381/85 |
| 6,122,018 A | * 9/2000 | Sugihara et al. | 348/705 |

* cited by examiner

Primary Examiner—Jeffrey Gaffin
Assistant Examiner—Rijue Mai
(74) Attorney, Agent, or Firm—Scott Charles Richardson; Kenneth J. Cool

(57) ABSTRACT

A method and an apparatus for automatically selecting an input device from a plurality of input devices coupled to an information handling system via a plurality of inputs, each corresponding to one of the plurality of inputs are disclosed. The plurality of inputs are scanned by a signal detector for the presence of a signal provided by one of the input devices to determine whether a signal is present on one of the inputs provided by the corresponding input device. When a signal is detected, the automatic video multiplexer selects the input on which a signal is detected according to a predefined hierarchy such that the information handling system receives the input signal provided by the corresponding input device. If a signal from a new input device is detected, the input corresponding to the new input device is selected, and the input device is configured to operate in conjunction with the information handling system.

23 Claims, 3 Drawing Sheets

VIDEO INPUT SELECTION FOR INFORMATION HANDLING SYSTEM

FIELD OF THE INVENTION

The present invention generally relates to the field of information handling systems, and particularly to automatic source selection in information handling systems.

BACKGROUND OF THE INVENTION

It is often desirable to connect a plurality of input sources to a single receiving device. For example, an information handling system may be connected to one or more video input devices for displaying a video signal received from the video input device on a display connected to the information handling system. Typical video input devices may include, for example, a videocassette recorder (VCR), a television (TV) tuner, a satellite video receiver, a digital versatile disc (DVD) player, a laser disc player, or a cable television (CATV) receiver. Typically, while the information handling system may be selected to receive video from a first source, such as a television, a user may desire to switch operation to a second video input source by turning on an alternate video device or by inserting an appropriate storage medium into an alternate video device. It would be highly desirable for the information handling system to automatically detect such action by the user, or a similar event, and automatically switch selection of the video input device to the new video input device without further user intervention.

SUMMARY OF THE INVENTION

The present invention is directed to a method for automatically selecting an input device from a plurality of input devices coupled to an information handling system via a plurality of inputs, each corresponding to one of the plurality of input devices. In one embodiment, the method includes steps for scanning the plurality of inputs for the presence of a signal provided by one of the plurality of input devices, determining whether a signal is present on one of the plurality of inputs provided by a corresponding one of the plurality of input devices by detecting the signal, and in the event a signal is detected on one of the plurality of inputs, selecting the one of the plurality of inputs on which a signal is present such that the information handling system receives the input signal provided by the corresponding one of the plurality of input devices.

The present invention is additionally directed to, in an information handling system, apparatus for automatically selecting an input device from a plurality of input devices coupled to an information handling system via a plurality of inputs, each corresponding to one of the plurality of input devices. In one embodiment, the apparatus includes a processor for executing a program of instructions on the information handling system, a memory coupled to the processor for storing the program of instructions executed by the processor, a selector coupled to the information handling system for selectively coupling any one of the plurality of input devices to the information handling system by selecting any one of the corresponding plurality of inputs, and a detector coupled to the selector for detecting a signal present on the selected one of the corresponding plurality of inputs such that the selector is capable of selecting the selected one of the corresponding plurality of inputs on which the detected signal is present.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to a presently preferred embodiment of the invention, an example of which is illustrated in the accompanying drawings.

Figure 1:
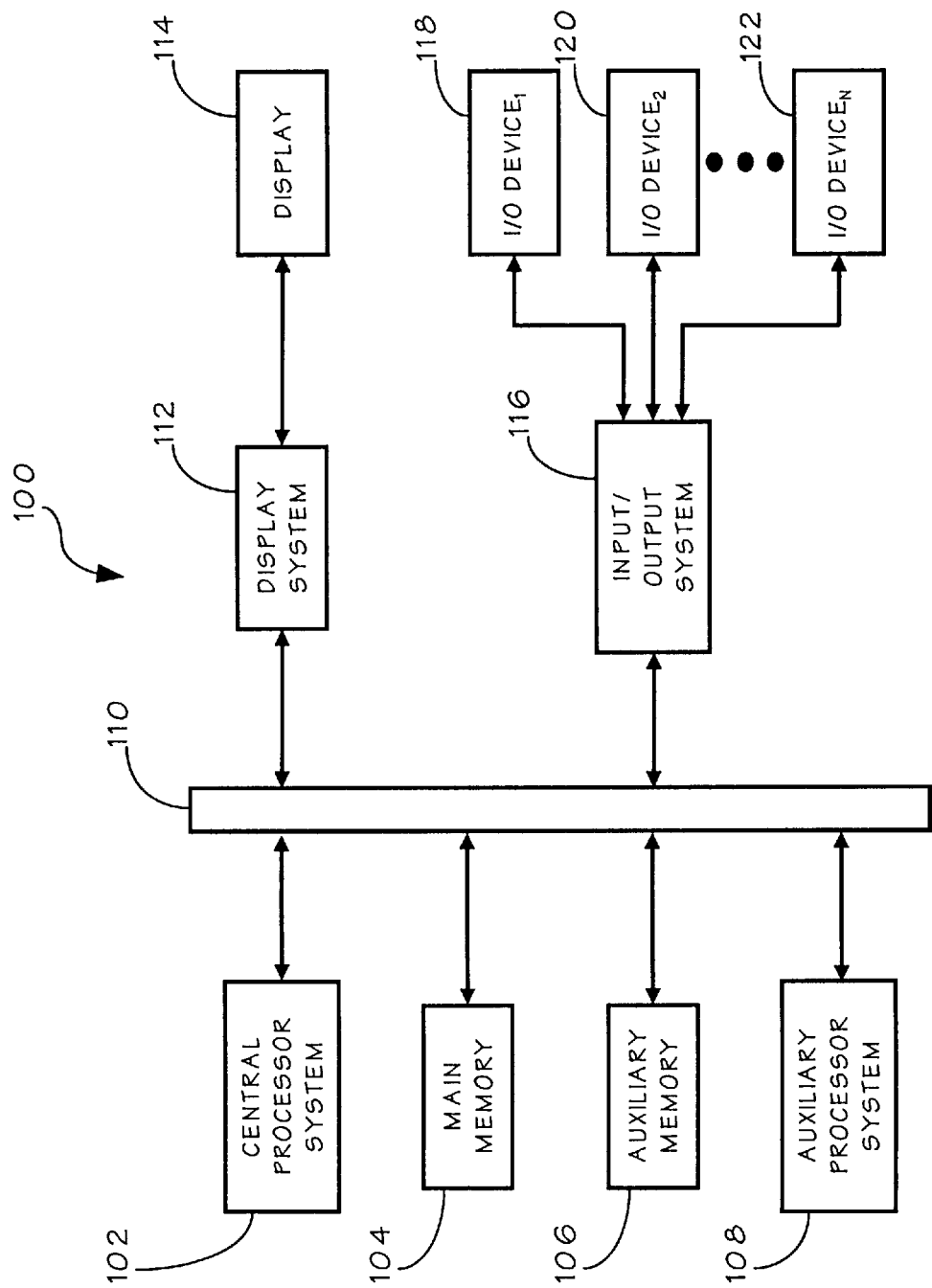
FIG. 1 is a block diagram of an information handling system operable to embody the present invention.

Referring now to FIG. 1, a hardware system in accordance with the present invention is shown. The hardware system shown in FIG. 1 is generally representative of a hardware architecture of an information handling system of the present invention. A central processor system 102 controls the information handling system 100. Central processor 102 includes a central processing unit such as a microprocessor or microcontroller for executing programs, performing data manipulations and controlling the tasks of information handling system 100. Communication with central processor 102 is implemented through a system bus 110 for transferring information among the components of information handling system 100. Bus 110 may include a data channel for facilitating information transfer between storage and other peripheral components of information handling system 100. Bus 110 further provides the set of signals required for communication with central processor 102, including a data bus, address bus, and control bus. Bus 110 may comprise any state of the art bus architecture according to promulgated standards, such as industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Furthermore, bus 100 may be compliant with any promulgated industry standard. For example, bus 100 may be designed in compliance with any of the following bus architectures: Industry Standard Architecture (ISA), Extended Industry Standard Architecture (EISA), Micro Channel Architecture, Peripheral Component Interconnect (PCI), Universal Serial Bus (USB), Access.bus, IEEE P1394, Apple Desktop Bus (ADB), Concentration Highway Interface (CHI), Fire Wire, Geo Port, or Small Computer Systems Interface (SCSI), as examples.

Other components of information handling system 100 include main memory 104, auxiliary memory 106, and an auxiliary processor system 108 as required. Main memory 104 provides storage of instructions and data for programs executing on central processor 102. Main memory 104 is typically semiconductor based memory such as dynamic random access memory (DRAM) and/or static random access memory (SRAM). Auxiliary memory 106 provides storage of instructions and data that are loaded into the main memory 104 before execution. Auxiliary memory 106 may include semiconductor based memory such as read-only memory (ROM), programmable read-only memory (PROM) erasable programmable read-only memory (EPROM), electrically erasable read-only memory (EEPROM), or flash memory (block oriented memory similar to EEPROM). Auxiliary memory 106 may also include a variety of non-semiconductor based memories, including but not limited to magnetic tape, drum, floppy disk, hard disk, optical, laser disk, compact disc read-only memory (CD-ROM), digital versatile disk read-only memory (DVD-ROM), digital versatile disk random-access memory (DVD-RAM), etc. Other varieties of memory devices are contemplated as well. Information handling system 100 may optionally include an auxiliary processor 108 which may be a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor.

Information handling system 100 further includes a display system 112 for connecting to a display device 114, and an input/output (I/O) system 116 for connecting to one or more I/O devices 118, 120, and up to N number of I/O devices 122. Display system 112 may comprise a video display adapter having all of the components for driving the display device, including video random access memory (VRAM), buffer, and graphics engine as desired. Display device 114 may comprise a cathode ray-tube (CRT) type display such as a monitor or television, or may comprise alternative type of display technologies such as a liquid-crystal display (LCD), a light-emitting diode (LED) display, or a gas or plasma display. Input/output system 116 may comprise one or more controllers or adapters for providing interface functions between one or more of I/O devices 118–122.

For example, input/output system 116 may comprise a serial port, parallel port, infrared port, network adapter, printer adapter, radio-frequency (RF) communications adapter, universal asynchronous receiver-transmitter (UART) port, etc., for interfacing between corresponding I/O devices such as a mouse, joystick, trackball, trackpad, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, speaker, etc. Input/output system 116 and I/O devices 118–122 may provide or receive analog or digital signals for communication between information handling system 100 of the present invention and external devices, networks, or information sources. Input/output system 116 and I/O devices 118–122 preferably implement industry promulgated architecture standards, including Recommended Standard 232 (RS-232) promulgated by the Electrical Industries Association, Infrared Data Association (IrDA) standards, Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, 802.11 for wireless networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of information handling system 100 of FIG. 1 by one having ordinary skill in the art would not depart from the scope or the spirit of the present invention.

Figure 2A:
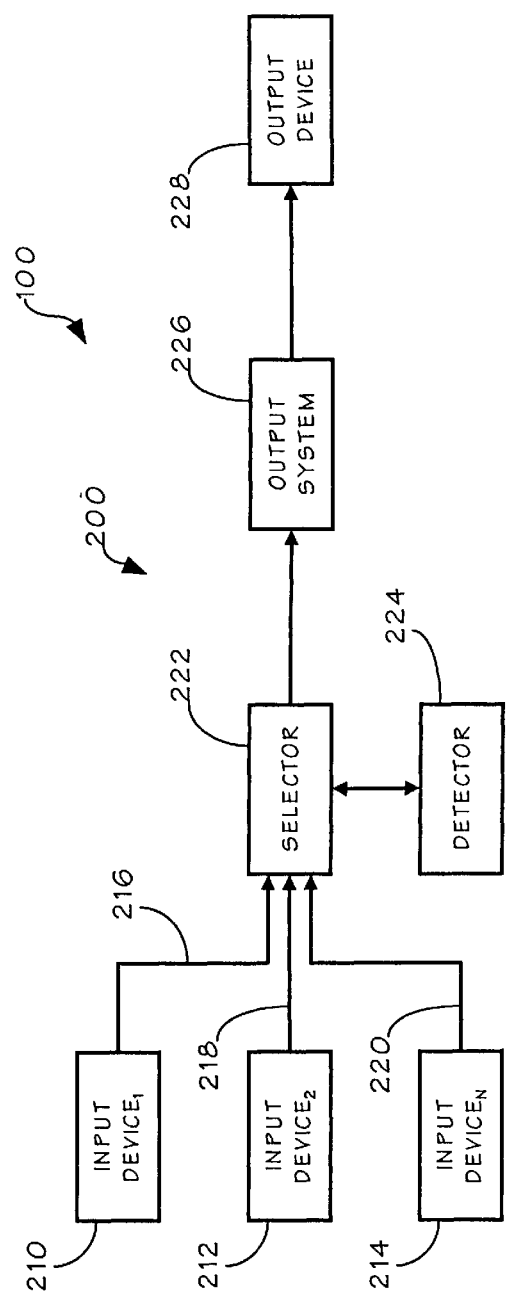
FIGS. 2A and 2B are block diagrams of an information handling system having a plurality of selectable input devices in accordance with the present invention.
Figure 2B:
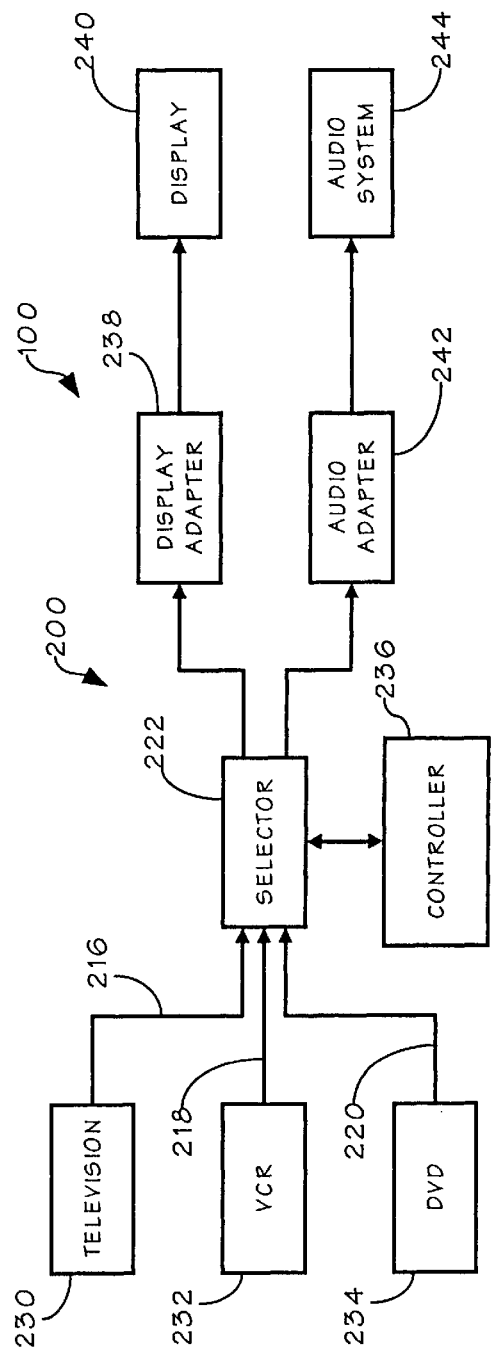

Referring now to FIGS. 2A and 2B, block diagrams of an information handling system in accordance with the present invention will be discussed. Referring specifically to FIG. 2A, an information handling system 100 implementing an apparatus 200 for input source selection is shown. Input source selection apparatus 200 may be embodied by or in information handling system 100 as a hardware device, implemented as a program of instructions executing on information handing system 100 (i.e. software), or may be a combination of both hardware and software. One or more input devices 210, 212 and 214 are connected to information handing system via corresponding inputs 216, 218 and 220. Information handling system 100 is capable of receiving an input signal from a plurality of input devices, up to N devices. Input devices may be multimedia devices providing an output signal having both audio and visual components, including but not limited to a television tuner 230, a video cassette recorder (VCR) 232, or a digital versatile disc (DVD) player 234 as shown in FIG. 2B. Input devices 210–214 may further include other types of signal providing devices, such as a broadcast satellite receiver, laser disc player, CD-ROM drive, hard disk drive, CD player, cable television tuner, digital audio tape (DAT) player, etc. Furthermore, it may be appreciated that one or more of input devices 210–214 may be a device that provides a signal to information handling system 100 based on a signal that the device receives from another information signal source. For example, one of the one or more devices 210–214 may be a modem or a gateway device, for example, for receiving an information signal via a network, such as the Internet, and for providing a signal to information handling system representative of the information signal received via the network. Input devices 210–214 may be any one or more of I/O devices 118–122 discussed with respect to FIG. 1.

Inputs 216–220 from one or more input devices 210–214 couple to information handling system 100 via a selector 222. Selector 222 allows a selected one of the one or more inputs 210 to be received by information handling system 100, and further to be directed to an output system 226 of information handling system 100. Output system 226 is capable of driving an output device 228 coupled to information handling system 100 with a signal received from an input device 210–214. As shown in FIG. 2B, signals received from one of the one or more input devices 210–214 may be provided to a display adapter 238 for displaying a video signal on a display 240 coupled to information handling system 100. In the event the selected input device provides an audio signal, such as from the audio portion of a television signal received from television tuner 230, the audio signal may be provided to an audio adapter 242 for providing the audio signal to an audio system 244 coupled to information handling system 100 such as an amplifier and speaker system.

Selector 222 may selectively receive an input signal from any one of the one or more input devices 210–214. A detector 224 is coupled to selector 222 for detecting the presence of an input signal on one or more inputs 216–220 and for indicating to selector 222 which of the one or more input devices 210–214 to select. Selector 222 selects to receive the signals provided by one of the one or more input devices 210–214 based upon the detection of a signal on one of the one or more inputs 216–220 by detector 224. Detector 224 may be tangibly embodied as a program of instructions executing on information handling system 100 for controlling selector 222. As shown in FIG. 2B, selector 222 may be embodied as a controller 236 of information handling system 100. Controller 236 may be implemented by central processor 102 of information handing system 100, or may be implemented as a separate auxiliary processor 108. Furthermore, controller 236 may be implemented as firmware, software routines stored in a read-only memory device.

Normally, a user of information handling system 100 may view a television signal received from television tuner 230 and displayed on display 240. In such a situation, selector 222 receives an input signal via input 216. Subsequently, the user may desire to view a program or movie stored on a videocassette. When the user inserts the videocassette into videocassette recorder 232, videocassette recorder 232 plays the videocassette and provides a signal on input 218. Normally, the user would be required to manually operate selector 222 to switch from television tuner 230 to VCR 232. In accordance with the present invention, detector 224 detects the presence of a signal on input 218 initiated by insertion of the videocassette into VCR 232 and provision of an output signal on input 218. Upon detection of the signal on input 218, selector 222 automatically selects VCR 232 by switching from input 216 to input 218 such that the output signal of the VCR is displayed on display 240. The same process may be repeated upon the occurrence of similar events. For example, upon a user inserting a DVD disc into DVD player 234 while selector 222 was receiving a VCR output signal from VCR 232 via input 218, detector 224 detects the DVD output signal on input 220, and selector 222 switches from input 218 to input 220 such that the DVD output signal is displayed on display 240.

Selection of one of the one or more input devices 210–214 by selector 222 may be implemented in several ways. Detector 224 may periodically scan inputs 216–220 to detect which of inputs 216–220 has an input signal thereon. The scanning may proceed sequentially among inputs 216–220 and then repeat as necessary. Alternatively, the user may initiate detector 224 to scan inputs 216–220 at an appropriate time. Thus, the user may place a videocassette into VCR 232 and then initiate a scan of inputs 216–220 by actuating a scan button on a control panel or remote control device (not shown) utilized for controlling information handling system 100. Upon initiation of a scan, detector 224 scans inputs 216–220 to detect the presence of an input signal such that selector 222 may select the input on which the input signal is present. When information handing system 100 is powered on, typically no device or only one device may be active and providing a signal. A scan of inputs 216–220 may be initiated at the powering on of information handling system 100 or when one of the one or more devices 210 is activated. Under such conditions, it is likely that only one device will be active such that only one of the inputs 216–220 will have a signal present thereon. When detector 224 detects the input signal on an active input, selector 222 may select the active device by selecting the corresponding input on which a signal is present. Under other conditions, more than one of the one or more devices 210–214 may be active simultaneously such that more than one of the inputs 216–220 may have a signal present thereon.

Detector 224 is capable of determining which of the multiple inputs having a signal thereon is the desired input for selector 222 to select. A first way in which determination of the desired input may be made is by saving information concerning the present video device in a memory in the form of a reference, pointer, notation or association to or with the present input. Thus, when there is initially only one active input and upon a scan of inputs 216–220 detector 224 detects the presence of signals on two inputs, detector 224 may compare the detected inputs to the input referenced or noted in memory. Since the desired input is typically the newly active input, detector 224 may detect that the input not referenced in memory is the desired input such that selector 222 selects the non-referenced input. An alternative way in which determination of the desired input may be made is by assigning a hierarchy to input devices 230. The hierarchy may be assigned according to one or more factors such as the frequency of use of each input device 210–214. For example, television tuner 230 may be the most frequently utilized device, VCR 232 may be the next most frequently utilized device, and DVD player 234 may be the least frequently utilized device. Based upon the frequency of utilization, the hierarchy may rank the devices according to the least frequently utilized device for selection precedence such that DVD player 234 has the highest selection precedence, VCR 232 has the next highest selection precedence, and television tuner 230 has the least highest selection precedence. Thus, between two or more active devices, DVD player 234 will be selected over VCR 232 and television tuner 230, and VCR 232 will be selected over television tuner 230. The frequency of device utilization may be monitored over time with information handling system 100 and may be reassigned in accordance with changing utilization patterns. Alternatively, the user may program information handling system 100 such that the hierarchy is defined according to user preference.

Thus, a scan may be initiated by a predetermined event, such as at the powering on of information handling system 100 or when the user activates a scan, and detector 224 may then scan inputs 216–220 for the presence of a signal. If detector 224 detects the presence of a signal on only one of inputs 216–220, then selector 222 selects that sole input such that the signal from the corresponding device is received by information handling system 100. If detector 224 detects the presence of signals on multiple inputs, information handling system 100 determines which of the multiple inputs is the desired input. Selector 222 selects the determined desired input such that the signal from the corresponding device is received by information handling system 100. In the event detector 224 detects the presence of a signal on one of inputs 216–220 corresponding to a new device that was not previously connected to or not previously configured to operate in conjunction with information handling system 100, a setup sequence may be initiated that identifies the new device and configures the new device to operate in conjunction with information handling system 100.

Figure 3:
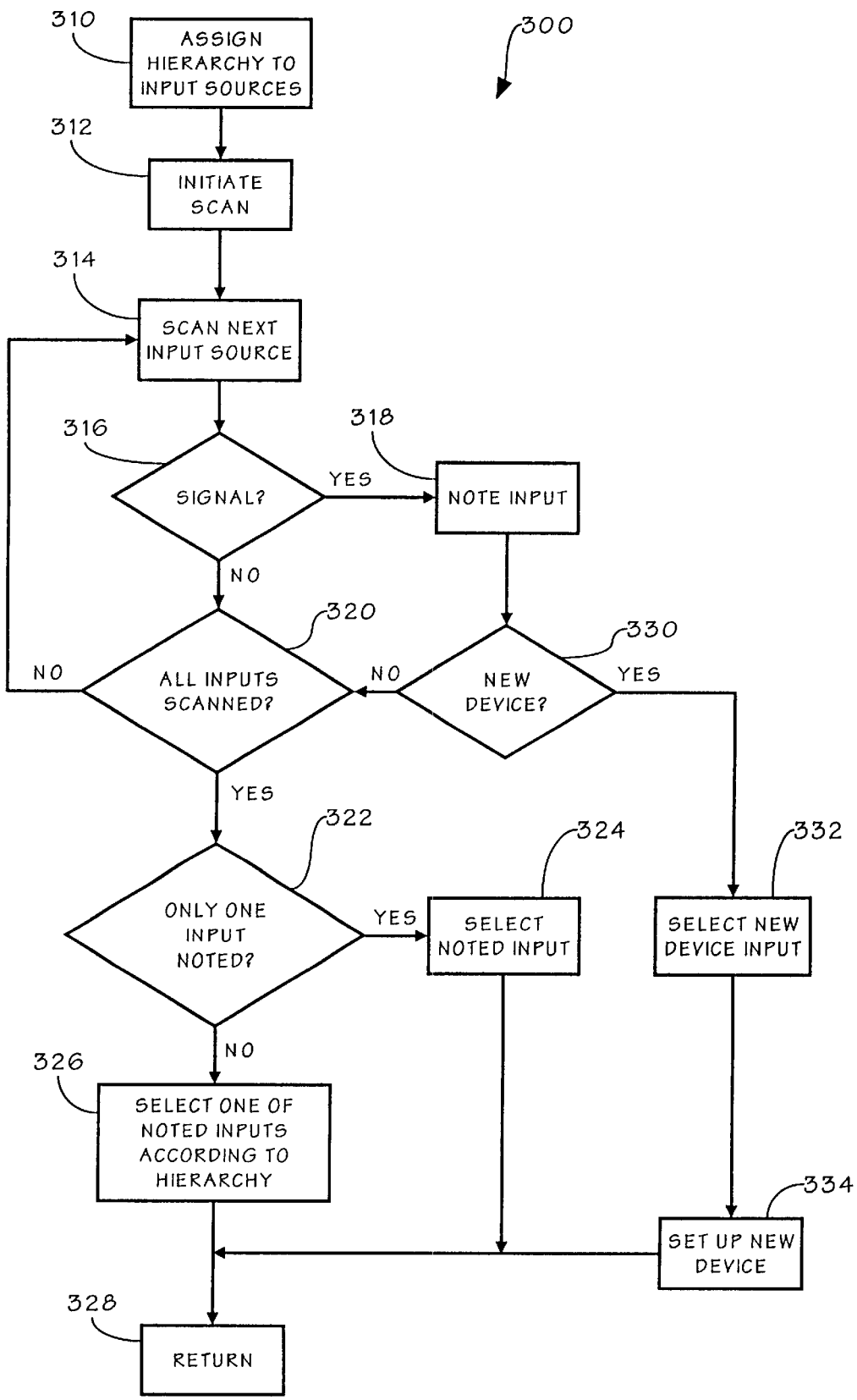
FIG. 3 is a flow diagram of a method for automatically selecting an input device in accordance with the present invention.

Referring now to FIG. 3, a flow diagram of a method for selecting an input device from a plurality of input devices will be discussed. A first step in the method 300 includes assigning a hierarchy to input sources 216–220 or to corresponding devices 210–214 executed as step 310. A scan is initiated at step 312 and may be initiated at periodic intervals, may be initiated upon the occurrence of a predetermined event (e.g., at the powering up of information handling system 100), or may be user initiated. The next input source, or the first input source if there were previously no previously activated sources, is scanned at step 314 to determine the presence of a signal on inputs 216–220. A determination is made at step 316 whether a signal is present on the currently tested input. In the event no signal is present on the currently tested input, a determination is made at step 320 whether all of the inputs have been tested for the presence of a signal. If all of the inputs have not been tested for the presence of a signal, the next succeeding input is tested at step 314, and the testing process continues. In the event a signal is detected on the currently tested input, the input is noted at step 318 in memory such as main memory 104 or auxiliary memory 106. A determination is made at step 330 whether the device coupled to the input on which a signal is detected is a new device. In the event the device is not a new device, method 300 proceeds at step 320. In the event the device is a new device, the input coupled to the new device is selected at step 332, and the new device is set up at step 334 for operation in conjunction with information handling system 100.

In the event that all inputs have been scanned and tested for the presence of a signal, a determination is made at step 322 whether only one input has been noted in memory. If only one input has been noted, then the noted input is selected for operation 324 such that information handing system 100 receives the signal from the device corresponding to the noted input. In the event more than one input is noted, one of the noted inputs is selected at step 326 according to the hierarchy of input sources assigned at step 310. Alternatively, the most recently noted input may be selected. Once all the inputs have been scanned and an appropriate input has been selected, method 300 returns at step 328 to a state from which method may be re-executed at an appropriate time or under an appropriate circumstance.

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 104 of one or more computer systems configured generally as described in FIG. 1. Until required by the computer system, the set of instructions may be stored in another computer readable memory such as auxiliary memory 106 of FIG. 1, for example in a hard disk drive or in a removable memory such as an optical disk for utilization in a CD-ROM drive, a floppy disk for utilization in a floppy disk drive, a floptical disk for utilization in a floptical drive, or a personal computer memory card for utilization in a personal computer card slot. Further, the set of instructions can be stored in the memory of another computer and transmitted over a local area network or a wide area network, such as the Internet, when desired by the user. Additionally, the instructions may be transmitted over a network in the form of an applet that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

Furthermore, it is understood that specifics of a preferred embodiment are not limitations on the present invention. For example, although the present invention monitors input signals, it is understood that there are other ways for an input device to notify the information handling system that it is currently active, including the transmission of specific current status data. Furthermore, it is understood that the although a preferred embodiment filters the input signals and only allows the selected signal to proceed to the information handling system, an alternative embodiment allows for all input signals to be forwarded to the information handling system for processing, and the information handling system then selects the desired input signal and processes the signal by forwarding the signal to a display means for displaying audiovisual signals or to speakers or headphones to broadcast audio signals. The display or broadcast of audiovisual or audio signals is also be covered by the term "presentation".

It is believed that the automatic video multiplexer of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A method for automatically selecting an input device from a plurality of input devices coupled to an information handling system via a plurality of inputs, each corresponding to one of the plurality of input devices, comprising:

scaning the plurality of inputs for the presence of a signal provided by one of the plurality of input devices;

determining whether a signal is present on one of the plurality of inputs provided by a corresponding one of the plurality of input devices by detecting the signal;

in the event a signal is detected on one of the plurality of inputs, selecting the one of the plurality of inputs on which a signal is present such that the information handling system processes the input signal provided by the corresponding one of the plurality of input devices for presentation; and determining whether the input device corresponding to the one of the plurality of inputs on which a signal is detected is a new device, and, in the event the input device is determined to be a new device, selecting the one of the plurality of inputs such that the information handling system processes the signal provided by the new device and setting up the new device to operate in conjunction with the information handling system.

2. The method as claimed in claim 1, further comprising the steps of determining whether all of the inputs have been scanned, and in the event all of the inputs have not been scanned, repeating said scanning step.

3. The method as claimed in claim 1, further comprising the steps of, in the event a signal is detected on multiple ones of the plurality of inputs, noting each one of the multiple ones of the plurality of inputs on which a signal is detected, and selecting one of the noted inputs such that the information handling system processes the input signal from the input device corresponding to the noted input.

4. The method as claimed in claim 1, further comprising the steps of assigning a hierarchy to the plurality of input devices, and scanning the plurality of inputs in an order corresponding to the hierarchy of the input devices.

5. The method as claimed in claim 1, further comprising the steps of, assigning a hierarchy to the plurality of input devices, and, in the event a signal is detected on multiple ones of the plurality of inputs, noting each one of the multiple ones of the plurality of inputs on which a signal is detected, and selecting one of the noted inputs such that the information handling system processes the input signal from the input device corresponding to the noted input, said selecting being based upon the hierarchy of the plurality of input devices.

6. The method as claimed in claim 1, at least one of said plurality of input devices being a video device providing a video signal to the information handling system.

7. The method as claimed in claim 1, at least one of said plurality of input devices being a video device providing a video signal to the information handling system, said information handing system driving a display coupled to the information handing system such that information representative of the video signal is displayed via the display.

8. The method as claimed in claim 1, at least one of said plurality of input devices being an audio device providing an audio signal to the information handling system.

9. The method as claimed in claim 1, at least one of said plurality of input devices being an audio device providing an audio signal to the information handling system, said information handing system driving an audio system coupled to the information handing system such that information representative of the audio signal is produced by the audio system.

10. The method as claimed in claim 1, at least one of said plurality of input devices being a data device providing a data signal to the information handling system.

11. The method as claimed in claim 1, at least one of said plurality of input devices being a data device providing a data signal to the information handling system, said information handing system driving a data processing system coupled to the information handing system such that information representative of the data signal is processed by the data processing system.

12. A program of instruction storable on a medium readable by an information handling system for causing an information handling system to execute steps for automatically selecting an input device from a plurality of input devices coupled to an information handling system via a plurality of inputs, each corresponding to one of the plurality of input devices, comprising:

scanning the plurality of inputs for the presence of a signal provided by one of the plurality of input devices;

determining whether a signal is present on one of the plurality of inputs provided by a corresponding one of the plurality of input devices by detecting the signal;

in the event a signal is detected on one of the plurality of inputs, selecting the one of the plurality of inputs on which a signal is present such that the information handling system processes the input signal provided by the corresponding one of the plurality of input devices for presentation; and determining whether the input device corresponding to the one of the plurality of inputs on which a signal is detected is a new device, and, in the event the input device is determined to be a new device, selecting the one of the plurality of inputs such that the information handling system processes the signal provided by the new device and setting up the new device to operate in conjunction with the information handling system.

13. The program of instructions storable on a medium readable by an information handling system as claimed in claim 12, the steps further comprising the steps of determining whether all of the inputs have been scanned, and in the event all of the inputs have not been scanned, repeating said scanning step.

14. The program of instructions storable on a medium readable by an information handling system as claimed in claim 12, the steps further comprising the steps of, in the event a signal is detected on multiple ones of the plurality of inputs, noting each one of the multiple ones of the plurality of inputs on which a signal is detected, and selecting one of the noted inputs such that the information handling system processes the input signal from the input device corresponding to the noted input.

15. The program of instructions storable on a medium readable by an information handling system as claimed in claim 12, the steps further comprising the steps of assigning a hierarchy to the plurality of input devices, and scanning the plurality of inputs in an order corresponding to the hierarchy of the input devices.

16. The program of instructions storable on a medium readable by an information handling system as claimed in claim 12, the steps further comprising the steps of, assigning a hierarchy to the plurality of input devices, and, in the event a signal is detected on multiple ones of the plurality of inputs, noting each one of the multiple ones of the plurality of inputs on which a signal is detected, and selecting one of the noted inputs such that the information handling system processes the input signal from the input device corresponding to the noted input, said selecting being based upon the hierarchy of the plurality of input devices.

17. The program of instructions storable on a medium readable by an information handling system as claimed in claim 12, at least one of said plurality of input devices being a video device providing a video signal to the information handling system.

18. The program of instructions storable on a medium readable by an information handling system as claimed in claim 12, at least one of said plurality of input devices being a video device providing a video signal to the information handling system, said information handing system driving a display coupled to the information handing system such that information representative of the video signal is displayed via the display.

19. The program of instructions storable on a medium readable by an information handling system as claimed in claim 12, at least one of said plurality of input devices being an audio device providing an audio signal to the information handling system.

20. The program of instructions storable on a medium readable by an information handling system as claimed in claim 12, at least one of said plurality of input devices being an audio device providing an audio signal to the information handling system, said information handing system driving an audio system coupled to the information handing system such that information representative of the audio signal is produced by the audio system.

21. The program of instructions storable on a medium readable by an information handling system as claimed in claim 12, at least one of said plurality of input devices being a data device providing a data signal to the information handling system.

22. The program of instructions storable on a medium readable by an information handling system as claimed in claims 12, at least one of said plurality of input devices being a data device providing a data signal to the information handling system, said information handing system driving a data processing system coupled to the information handing system such that information representative of the data signal is processed by the data processing system.

23. In an information handling system, an apparatus for automatically selecting an input device from a plurality of input devices coupled to an information handling system via a plurality of inputs, each corresponding to one of the plurality of input devices, comprising:

means for executing a program of instructions on the information handling system;

means, coupled to said executing means, for storing the program of instructions executed by said executing means;

means coupled to the information handling system for selectively coupling any one of the plurality of input devices to the information handling system by selecting any one of the corresponding plurality of inputs;

means, coupled to said selectively coupling means, for detecting a signal present on the selected one of the corresponding plurality of inputs such that said selectively coupling means is capable of selecting the selected one of the corresponding plurality of inputs on which the detected signal is present; and means for determining whether the input device corresponding to the one of the plurality of inputs on which a signal is detected is a new device, and, based on the input device being determined to be a new device, instructing said selectively coupling means to selectively couple the new device such that the information handling system processes the signal provided by the new device and sets up the new device to operate in conjunction with the information handling system.

\* \* \* \* \*